(12) United States Patent
Liu et al.

(10) Patent No.: US 7,477,344 B2
(45) Date of Patent: Jan. 13, 2009

(54) LIQUID CRYSTAL DISPLAY PANEL

(75) Inventors: Chung-Yuan Liu, Tainan County (TW); Bing-Jei Liao, Tainan County (TW)

(73) Assignee: Himax Technologies, Inc, Tainan County (TW)

( * ) Notice: Subject to any disclaimer, the term of this patent is extended or adjusted under 35 U.S.C. 154(b) by 640 days.

(21) Appl. No.: 10/908,027

(22) Filed: Apr. 26, 2005

(65) Prior Publication Data
US 2006/0119767 A1    Jun. 8, 2006

(30) Foreign Application Priority Data
Dec. 3, 2004    (TW) .............................. 93137322 A

(51) Int. Cl.
*G02F 1/1335* (2006.01)
(52) U.S. Cl. .................. 349/106; 349/108; 349/122
(58) Field of Classification Search ............. 349/106, 349/107, 108, 109, 122, 138, 179, 158; 359/891; 345/88
See application file for complete search history.

(56) References Cited

U.S. PATENT DOCUMENTS 4,654,117 A * 3/1987 Aoki et al. ............... 438/160
5,936,693 A * 8/1999 Yoshida et al. ........... 349/139
2004/0095527 A1 * 5/2004 Liao ......................... 349/106

FOREIGN PATENT DOCUMENTS

| JP | 1035590 | 2/1989 |
|----|---------|--------|
| TW | 564327  | 12/2003 |

\* cited by examiner

*Primary Examiner*—Dung Nguyen
*Assistant Examiner*—Tai Duong
(74) *Attorney, Agent, or Firm*—Jianq Chyun IP Office

(57) ABSTRACT

A liquid crystal display (LCD) panel comprises a first substrate; a first electrode layer; a colour filter film comprising red, blue and green filter layers; a second substrate; a liquid crystal layer; and a second electrode layer. The first electrode layer is disposed on the first substrate and the colour filter film is disposed on the first electrode layer, and the liquid crystal layer is disposed between the colour filter film and the second substrate. According to the present invention, colour filter film with a high dielectric constant (i.e. larger than 3) is employ to effectively increase voltage of the liquid crystal layer to effectively promote the contrast of images displayed by the LCD panel.

12 Claims, 3 Drawing Sheets

300

LIQUID CRYSTAL DISPLAY PANEL

CROSS-REFERENCE TO RELATED APPLICATION

This application claims the priority benefit of Taiwan application serial no. 93137322, filed on Dec. 3, 2004. All disclosure of the Taiwan application is incorporated herein by reference.

BACKGROUND OF THE INVENTION

1. Field of the Invention

The present invention generally relates to a display panel, and more particularly, to a liquid crystal display (LCD) panel.

2. Description of Related Art

In recent years, along with development of optoelectronic technology and semiconductor technology, volume of video or image devices have been increasingly compacted making it possible of manufacturing lighter, flatter, thinner and smaller flat panel displays, and therefore flat panel displays has become increasingly popular and accordingly became the mainstream for development of display devices. Although conventional cathode-ray tubes (CRTs) have their advantages of low cost, excellent image quality, however, the disadvantages of larger space occupation due to their larger volume and high radiation harmful to eyes of users makes them unattractive. Nowadays, flat panel displays developed by combining the optoelectronic technology and the semiconductor technology, for example, such as liquid crystal displays (LCDs), organic electro-luminescent displays (OLEDs), or plasma display panels (PDPs), have gradually replaced the conventional CRT display and have become a mainstream of display devices.

Because, the LCDs have several advantageous features including thin-flat shape, lightweight, low operating voltage, low power-consumption, full colourization and low radiation, etc., they will become a mainstream of the 21st century's display devices. The LCDs are classified into a transmission type, a reflective type and a transflective type according to their light-emitting mechanisms, wherein the reflective LCDs include liquid crystal projectors and reflective liquid crystal on silicon (LCOS), etc.

FIG. 1 is a cross sectional view of a conventional reflective LCD panel. Referring to FIG. 1, the conventional reflective LCD panel 100 comprises a first substrate 110, a second substrate 120 and a liquid crystal layer 130 disposed between the first substrate 110 and the second substrate 120. The first substrate 110 comprises a glass substrate 110a, an electrode layer 112, a protective layer 114, a colour filter film 116 and a first alignment film 118, wherein the electrode layer 112 comprises alumina material. The electrode layer 112 is disposed on the glass substrate 100a and the protective layer 114 is disposed on the electrode layer 112. The colour filter film 116 is disposed on the protective layer 114 and the first alignment film 118 is disposed on the colour filter film 116.

The second substrate 120 comprises a glass substrate 120a, a transparent electrode layer 122 and a second alignment film 124, wherein the transparent electrode layer 122 comprises Indium-Tin-Oxide (ITO) material. The transparent electrode layer 122 is disposed on the glass substrate 120a and the second alignment film 124 is disposed on the transparent electrode layer 122.

When the reflective LCD displays images, images with different gray scales can be obtained by a range of rotation angles of a plurality of liquid crystal molecules in the liquid crystal layer 130. The rotation angles are determined by an electrical potential difference between the electrode layer 112 and the transparent electrode layer 122 after an external power source is applied thereto.

It is noticeable that the electrical potential difference between the electrode layer 112 and the transparent electrode layer 122 is reduced because their interposed layers share their electrical potential difference and the interposed layers comprise the protective layer 114, the colour filter film 116, the first alignment film 118, the second alignment film 124 and the liquid crystal layer 130. Since the protective layer 114, the colour filter film 116, the first alignment film 118, the second alignment film 124 share the electrical potential difference between the electrode layer 112 and the transparent electrode layer 122, an acquired voltage of the liquid crystal layer 130 is reduced. Thus, these liquid crystal molecules in the liquid crystal layer 130 can not obtain a sufficient voltage in order to be fully rotated and thereby cause the reflective LCD panel 100 to display images with a poor contrast.

Evidently, under a condition of biasing the electrode layer 112 and the transparent electrode layer 122 with a fixed electrical potential difference, thickness reductions of the protective layer 114, the colour filter film 116, the first alignment film 118 and the second alignment film 124 can lower their shared electrical potential difference. Therefore, the acquired voltage of the liquid crystal layer 130 is raised. However, the reflective LCD has a poor colour-displaying performance because of the thickness reduction of the colour filter film 116.

In addition, under a condition of biasing the electrode layer 112 and the transparent electrode layer 122 with a fixed electrical potential difference, since a red colour filter film, a green colour filter film and a blue colour filter film (all not shown), three of which compose the colour filter film 116, have their different reflectance, the reflective LCD panel 100 displays images with a higher dispersion.

SUMMARY OF THE INVENTION

Accordingly, the present invention is directed to an LCD panel comprising a colour filter film with a high dielectric constant capable of improving the contrast of images displayed by the reflective LCD panel 100.

The present invention is further directed to an LCD panel capable of reducing its dispersion by employing red, blue and green colour filter films with desirable dielectric constants.

According to an embodiment of the present invention, the LCD panel comprises a first substrate, a second substrate, a first electrode layer, a colour filter film and a liquid crystal layer. The first electrode layer is disposed on the first substrate and the colour filter film is disposed on the first electrode layer. The liquid crystal layer is disposed between the colour filter film and the second substrate. Since the colour filter film has a high dielectric constant (for example, larger than 3), an acquired voltage of the liquid crystal layer may be increased so as to display images with sufficient gray scales.

According to another embodiment of the present invention, the LCD panel comprises a second substrate, a first electrode layer, a colour filter film and a liquid crystal layer. The first electrode layer is disposed on the first substrate and the colour filter film is disposed on the first electrode layer. The liquid crystal layer is disposed between the colour filter film and the second substrate. The colour filter film comprises a first colour filter film, a second colour filter film and a third colour filter film, dielectric constants of which are different from one another or a dielectric constant of one is different from that of the other two.

According to an embodiment of the present invention, the colour filter film is doped with silicon nitride material.

According to an embodiment of the present invention, the first substrate further comprises a protective layer disposed between a first electrode layer and a colour filter film.

According to an embodiment of the present invention, a dielectric constant of the first colour filter film is larger than that of the second colour filter film and the third colour filter film. When the LCD panel with a twisted nematic mode, the first colour filter film, the second colour filter film and the third colour filter film function as a blue colour filter film, a green colour filter film and a red colour filter film, respectively. Furthermore, when the LCD panel is in one vertical alignment mode, the first colour filter film, the second colour filter film and the third colour filter film are a red colour filter film, a green colour filter film and a blue colour filter film, respectively.

According to an embodiment of the present invention, the LCD panel is a liquid crystal on silicon(LCOS) panel.

Since the LCD panel of the present invention employs a colour filter film with a high dielectric constant, under a condition of biasing two electrode layers with a fixed electrical potential difference, a shared electrical potential difference of the colour filter film is reduced so as to raise an acquired voltage of the liquid crystal layer. As such, the molecules of the liquid crystal layer can gain a sufficient voltage in order to be fully rotated and thereby raise a contrast of images displayed by the reflective LCD panel. In addition, by controlling dielectric constants of the red colour filter film, the green colour filter film and the blue colour filter film, reflectance of the red colour filter film, the green colour filter film and the blue colour filter film can be varied when driven by a fixed voltage. Thus, dispersion of the reflective LCD panel can be effectively reduced and three gamma curves of the red colour filter film, the green colour filter film and the blue colour filter film can be adjusted to be consistent, by which only one corresponding circuit for one gamma curve is needed instead of three corresponding circuits for three gamma curves.

The objectives, other features and advantages of the invention will become more apparent and easily understood from the following detailed description of the invention when taken in conjunction with the accompanying drawings.

BRIEF DESCRIPTION OF THE DRAWINGS

The accompanying drawings are included to provide an LCD panel of the present invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to an LCD panel of embodiments of the present invention, examples of which are illustrated in the accompanying drawings.

First Embodiment

Figure 1:
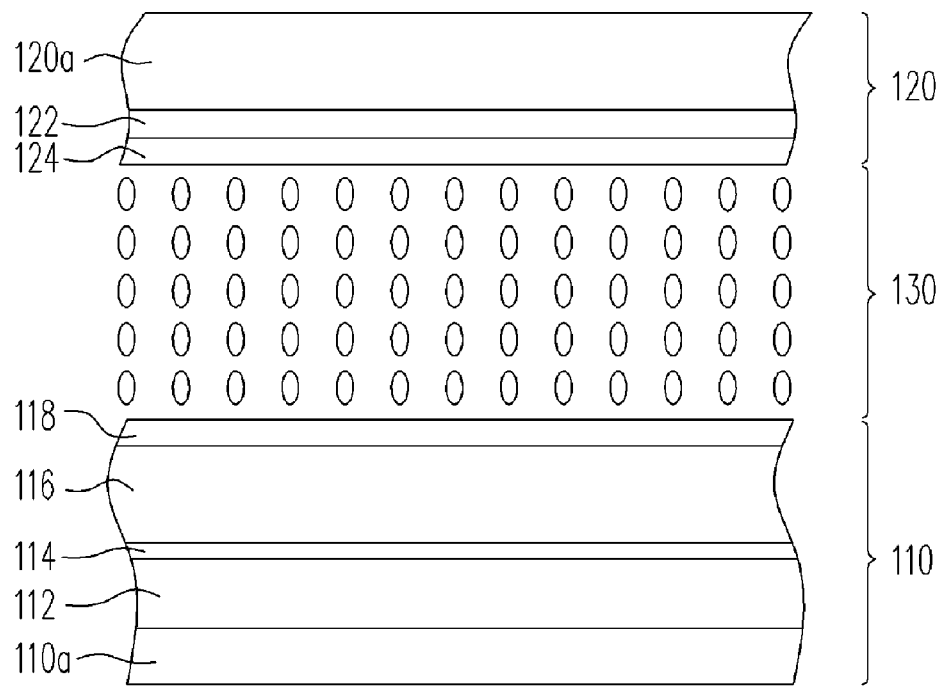
FIG. 1 is a cross sectional view of a conventional reflective LCD panel.
Figure 2:
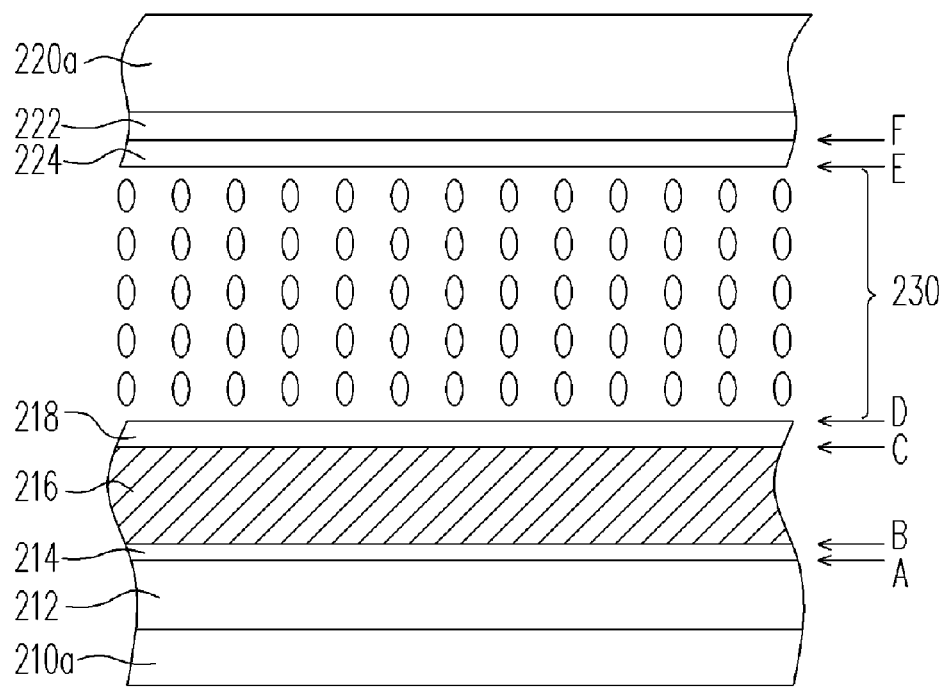
FIG. 2 is a cross sectional view of a reflective LCD panel according to a first embodiment of the present invention.

FIG. 2 is a cross sectional view of a reflective LCD panel of an embodiment of the present invention. Referring to FIG. 2, an LCD panel 200, for example, comprises a first substrate 210a, a first electrode layer 212, a colour filter film 216, a first alignment film 218, a second substrate 220a, a second electrode layer 222, a second alignment film 224 and a liquid crystal layer 230. The first electrode layer 212 is disposed on the first substrate 210a, wherein the first substrate 210a is comprised of silicon, plastic or glass material and the first electrode layer 212 is comprised of an alumina material, and the like. In addition, the colour filter film 216 is disposed on the first electrode layer 212 and has a higher dielectric constant (for example, a dielectric constant larger than 3). For example, the colour filter film 216 contains a nitride-doped material. Besides, the first alignment film 218 is disposed on the colour filter film 216. The reflective LCD panel may be a liquid crystal on silicon (LCOS) display panel.

The second alignment film 224 is disposed over the first alignment film 218 (not directly contact with the first alignment film 218) and the second electrode layer 222 is disposed on the second alignment film 224, wherein the second electrode layer 222 contains ITO material etc. The second substrate 220a is disposed on the second electrode layer 222, wherein the second substrate 220a is comprised of a transparent plastic or glass material and the like. The liquid crystal layer 230, which comprises a plurality of molecules, is disposed between the first substrate 210a and the second substrate 220a. When a voltage is applied to the first electrode layer 212 and the second electrode layer 222, the molecules of the liquid crystal layer 230 rotate in accordance with an electrical potential difference between the first electrode layer 212 and the second electrode layer 222.

The LCD panel 200 further comprises a protective layer 214 disposed between the first electrode layer 212 and the colour filter film 216 to protect the first electrode layer 212.

It should be noted that since the colour filter film 216 of the LCD panel 200 has a higher dielectric constant, when the first electrode layer 212 and the second electrode layer 222 are biased with a fixed voltage, a shared voltage of the colour filter film 216 is reduced so as to raise an acquired voltage of the liquid crystal layer 230. Therefore, the molecules in the liquid crystal layer 230 can obtain a sufficient voltage in order to be fully rotated. Thus, a contrast of images displayed by the reflective LCD panel 200 can be effective promoted.

To verify a conclusion described above, experimental results of dielectric constants of the colour filter film 216 and voltage of the liquid crystal layer 230 of the LCD panel 200 are obtained and described in detail as follows. Referring to FIG. 2, this experiment is conducted by applying a fixed driven voltage 5 v across the first electrode layer 212 and the second electrode layer 222. For describing functions of the LCD panel, according to the present invention, every two consecutive layers/films of the first substrate 210a, the protective layer 214, the colour filter film 216, the first alignment film 218, the liquid crystal layer 230, the second alignment layer 224 and the second electrode layer 222 define junctions. In addition, these junctions are designated by points A, B, C, D, E and F in FIG. 2 as different reference electrical potential points.

The following table (1) shows relationships among every individual dielectric constant of the colour filter film 216, their corresponding reference electrical potential at points A, B, C, D, E and F, as well as voltage of the colour filter film 216 and the liquid crystal layer 230.

TABLE 1

| | dielectric constant of the colour filter film 216 | | | | | | |
|---|---|---|---|---|---|---|---|
| | 1 | 3 | 5 | 7 | 9 | 11 | 13 |
| reference electrical potential point F | 0 | 0 | 0 | 0 | 0 | 0 | 0 |
| reference electrical potential point E | 0.076 | 0.16 | 0.206 | 0.234 | 0.253 | 0.267 | 0.277 |
| reference electrical potential point D | 1.39 | 2.519 | 2.587 | 2.859 | 3.046 | 3.182 | 3.285 |
| reference electrical potential point C | 1.466 | 2.319 | 2.793 | 3.093 | 3.298 | 3.448 | 3.562 |
| reference electrical potential point B | 4.869 | 4.723 | 4.644 | 4.595 | 4.562 | 4.539 | 4.521 |
| reference electrical potential point A | 5 | 5 | 5 | 5 | 5 | 5 | 5 |
| voltage of the colour filter film 216 (unit: volt) | 3.403 | 2.404 | 1.851 | 1.502 | 1.264 | 1.091 | 0.959 |
| voltage of the liquid crystal layer 230 (unit: volt) | 1.314 | 1.999 | 2.381 | 2.625 | 2.793 | 2.915 | 3.008 |

Referring to table (1), this table assumes that an electrical potential of the reference electrical potential point F (that is a junction between the second alignment layer 224 and the second electrode layer 222) is zero. Also, an electrical potential of the reference electrical potential point A (that is a junction between the protective layer 214 and the first electrode layer 212) is 5 v due to application of a driving voltage 5 v between the first and second electrode layers 212 and 222. A voltage of the colour filter film 216 is obtained by subtracting the electrical potential of the reference electrical potential point C from that of the reference electrical potential point B. Similarly, a voltage of the liquid crystal layer 230 is obtained by subtracting the electrical potential of the reference electrical potential point E from that of the reference electrical potential point D.

As can be observed from the table (1), for example, when a dielectric constant of the colour filter film 216 is 1, a voltage of the colour filter film 216 is 3.403 v and a voltage of the liquid crystal layer 230 is 1.314 v. Moreover, when a dielectric constant of the colour filter film 216 is 13, a voltage of the colour filter film 216 is 0.959 v and a voltage of the liquid crystal layer 230 is 3.008 v. In other words, the higher the dielectric constant of the colour filter film 216 is, the lower the voltage of the colour filter film 216 is or conversely, the higher the voltage of the liquid crystal layer 230 is.

Figure 3:
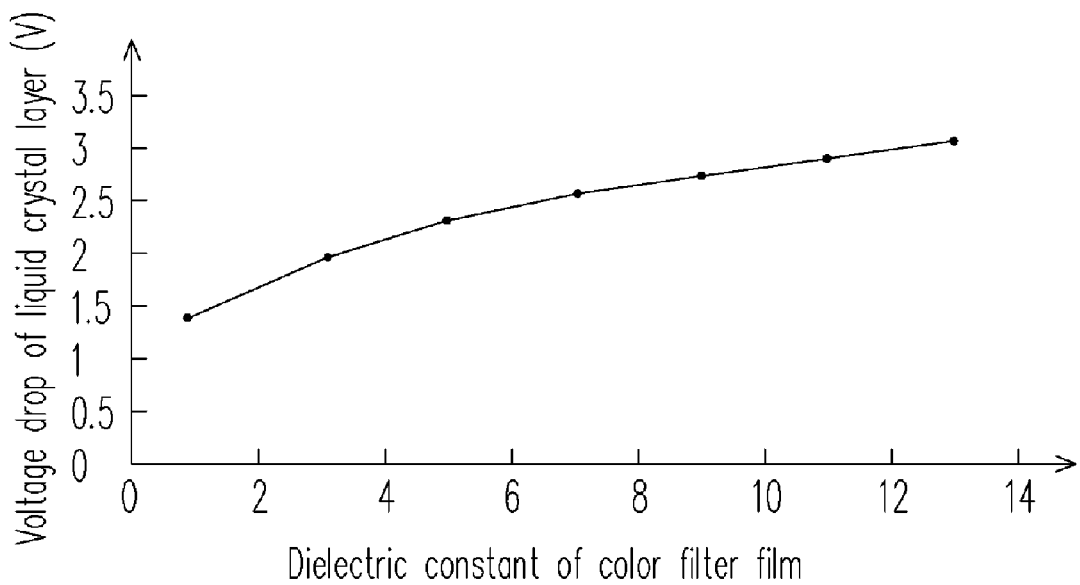
FIG. 3 are curves showing the relationship of a dielectric constant of a colour filter film vs. voltage of a liquid crystal layer of a reflective LCD panel according to the first embodiment of the present invention.

Further, FIG. 3 are curves showing the relationship of a dielectric constant of a colour filter film vs. voltage of a liquid crystal layer of the reflective LCD panel according to an embodiment of the present invention. Referring to FIG. 3, curves in FIG. 3 are drawn in accordance with dielectric constants of the colour filter film and voltage of the liquid crystal film. As can be inferred from the above curves that when the dielectric constant of the colour filter film 216 increases, especially in a range of 1-3, the voltage of the liquid crystal layer 230 is observed to be largest, and when the dielectric constant of the colour filter film 216 is above 5, the voltage of the liquid crystal layer 230 is almost constant due to saturation.

Second Embodiment

Figure 4:
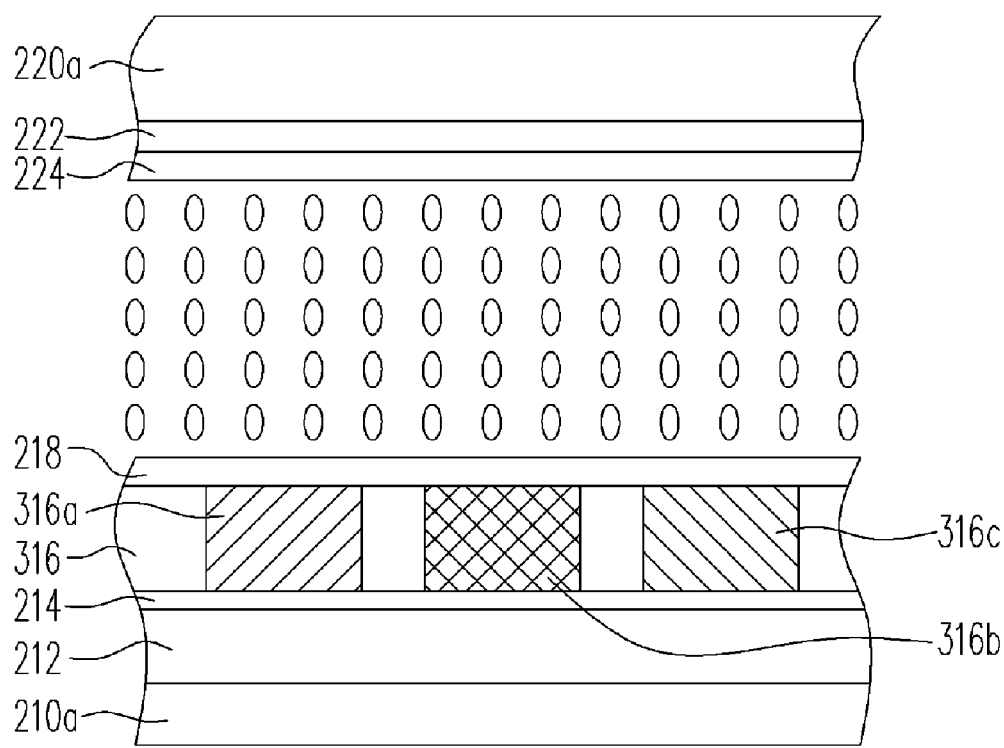
FIG. 4 is a cross sectional view of a reflective LCD panel according to a second embodiment of the present invention.

FIG. 4 is a cross sectional view of a reflective LCD panel according to a second embodiment of the present invention. Referring to FIG. 4, in contrast with the LCD panel 200 described above, a colour filter film 316 of an LCD panel 300 comprises a red colour filter film 316a, a green colour filter film 316b and a blue colour filter film 316c. As to other components of the LCD panel 300 and their space arrangements, they are the same as those of the LCD panel 200, and a detail description thereof are not repeated.

Figure 5A:
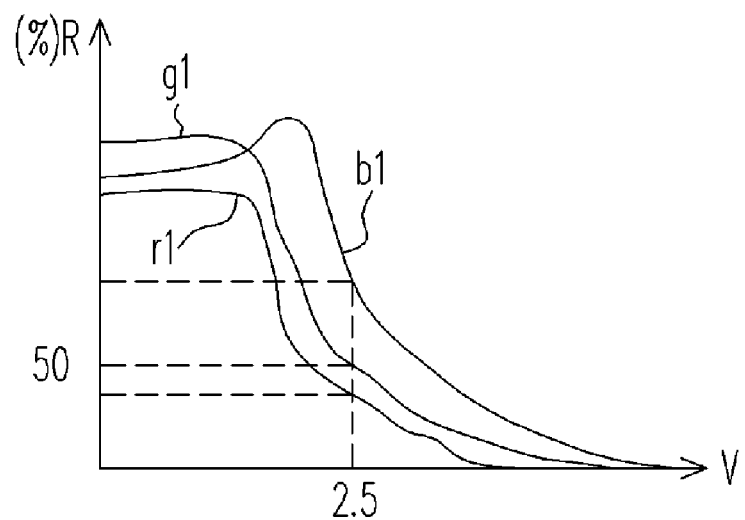
FIG. 5A are curves showing the relationship of reflectance vs. voltage of a red colour filter film, a green colour filter film and a blue colour filter film in a reflective LCD panel with a twisted nematic mode according to the second embodiment of the present invention.

In addition, FIG. 5A are curves showing the relationship of reflectance vs. voltage of the red colour filter film, the green colour filter film and the blue colour filter film of a reflective LCD panel with a twisted nematic mode according to another embodiment of the present invention. Referring to FIGS. 4 and 5A concurrently, the horizontal axis V of reflectance vs. voltage (R-V) curve diagram represents voltage of the liquid crystal layer 230 while the vertical axis R represents light reflectance of the colour filter film 316. The curve r1 represents an R-V curve of the red colour filter film, the curve g1 represents an R-V curve of the green colour filter film and the curve b1 represents an R-V curve of the blue colour filter film. Furthermore, when the LCD panel 300 with a twisted nematic mode, reflectance of curves r1, g1 and b1 first generally maintain at an approximately stable value and then decrease with increase of voltage of the liquid crystal layer 230. Meanwhile, an operating voltage range of the LCD panel 300 with the twisted nematic mode (i.e. a voltage range allowing the liquid crystal fully activated) is located in decrement sections of the curves r1, g1 and b1 (not shown).

Referring to FIGS. 4 and 5A, when a voltage of the liquid crystal layer 230 is 2.5 v, reflectance of the green colour filter film 316b is 50% and reflectance of the blue colour filter film 316c>reflectance of the green colour filter film 316b>reflectance of the red colour filter film 316a. Namely, colour displayed by the LCD panel 300 is distorted. In other words, the LCD panel 300 has a higher dispersion.

To effectively improve the dispersion problem of the LCD panel 300 with the twisted nematic mode described above, a voltage of the liquid crystal layer 230 disposed on the blue colour filter film 316c is raised by raising a dielectric constant of the blue colour filter film 316c. Therefore, reflectance of the blue colour filter film 316c is correspondingly reduced approaching to reflectance of the green colour filter film 316b. Similarly, reflectance of the red colour filter film 316a is raised by lowering a dielectric constant of the red colour filter film 316a so that reflectance of the red colour filter film 316a approaches to reflectance of the green colour filter film 316b. When a fixed voltage is applied to the red colour filter film 316a, the green colour filter film 316b and the blue colour filter film 316c, their reflectance approaches to a same value due to the condition that a dielectric constant of the blue colour filter film 316c>a dielectric constant of the green colour filter film 316b>a dielectric constant of the red colour filter film 316a. Thus, the dispersion of the LCD panel 300 can be effectively reduced.

Figure 5B:
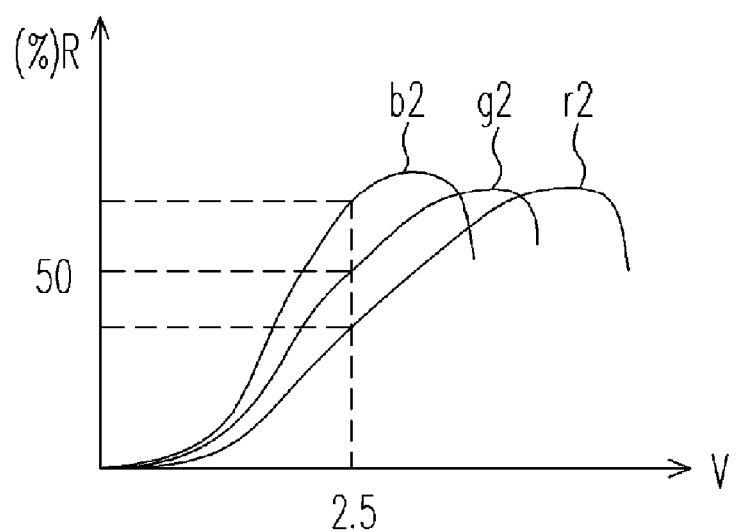
FIG. 5B are curves showing the relationship of reflectance vs. voltage of a red colour filter film, a green colour filter film and a blue colour filter film in a vertical alignment mode in a reflective LCD panel according to the second embodiment of the present invention.

FIG. 5B curves showing the relationship diagram of reflectance vs. voltage of a red colour filter film, a green colour filter film and a blue colour filter film in a reflective LCD panel with a vertical alignment mode according to the second embodiment of the present invention. Referring to FIGS. 4 and 5A concurrently, when the LCD panel 300 with the vertical alignment mode, the horizontal axis V of reflectance vs. voltage (R-V) curves represents voltage of the liquid crystal layer 230 while the vertical axis R represents reflectance of the colour filter film 316. The curve r2 represents an R-V curve of the red colour filter film 316a, the curve g2 represents an R-V curve of the green colour filter film 316b and the curve b2 represents an R-V curve of the blue colour filter film 316c.

Referring to FIGS. 5A and 5B, in contrast to R-V curves of LCD panel with the twisted nematic mode shown in FIG. 5A, curves r2, g2 and b2 of LCD panel with the vertical alignment mode, in FIG. 5B, shows that their corresponding reflectance steadily increases first with the increase voltage of the liquid crystal layer 230 up to a certain initial range, and gets saturated and then decreases with further increase of voltage of the liquid crystal layer 230. In addition, an operating voltage range (i.e. a voltage range that fully activate the liquid crystal) of the LCD panel 300 with the vertical alignment mode is located in increment sections (not shown) of curves r2, g2 and b2.

Referring to FIGS. 4 and 5B concurrently, to effectively improve the dispersion problem of the LCD panel 300 with the vertical alignment mode, the dielectric constant of the blue colour filter film 316c may be lowered and the dielectric constant of the red colour filter film 316a may be raised (i.e. in a condition the dielectric constant of the red colour filter film 316a>the dielectric constant of the green colour filter film 316b>the dielectric constant of the blue colour filter film 316c). As such, reflectance of the red colour filter film 316a and the blue colour filter film 316c respectively approach reflectance of the green colour filter film 316b. Therefore, dispersion of the LCD panel 300 can be effectively reduced.

It should be noted, according to the present invention, regardless whether LCD panel with a twisted nematic mode, a vertical alignment mode or any other mode), the red colour filter film 316a, the green colour filter film 316b and the blue colour filter film 316c with specific or desired dielectric constant can be utilized such that the voltage of the liquid crystal layer 230 is confined in an operating voltage range of the LCD panel 300 (i.e. a voltage range that fully activate the liquid crystal). Thus, the LCD panel 300 can display images with a sufficient contrast and have low dispersion.

Referring to FIGS. 4 and 5B concurrently, compared to the conventional method for resolving the dispersion problem, where three corresponding circuits for three set gamma curves are used to supply three different voltages for driving the red colour filter film, the green colour filter film and the blue colour filter film, the present invention proposes using one or more colour filter layers with desirable or specific dielectric constant such that red, green and blue gamma curves are rendered consistent with each other. In other words, the dielectric constant of the red colour filter film 316a is determined in accordance with the red gamma curve, the dielectric constant of the green colour filter film 316b is determined in accordance with the green gamma curve and the dielectric constant of the blue colour filter film 316c is determined in accordance with the blue gamma curve. As such, only one corresponding circuit for one set gamma curve is required as opposed to three corresponding circuits in the conventional scheme of resolving the dispersion problems.

Accordingly, the present invention has at least the following advantages.

1. In contrast to the conventional LCD panel, the LCD panel of the present invention employs colour filter films with higher dielectric constant (for example, larger than 3) for effectively raising the acquired voltage of the liquid crystal layer. Therefore, the molecules in the liquid crystal layer can gain a sufficient voltage in order to be fully activated. Thus, the contrast of images displayed by the reflective LCD panel can be effectively promoted.

2. By employing red, green and blue filter films with desirable dielectric constants, reflectance of the red filter film, the green filter film and the blue filter film of the LCD panel with different arrangement mode (for example, twisted nematic mode or vertical alignment mode) can be rendered substantially same. Hence, it is possible to a low dispersion of the LCD panel.

3. In the present invention, the red, green and blue gamma curves can be adjusted to a same value by employing the red colour filter film, the green filter film and the blue filter film with desirable or specific dielectric constants so that only one corresponding circuit is required as opposed to three corresponding circuits according to the conventional scheme for resolving the dispersion problems.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal panel, comprising:
   a first substrate;
   a second substrate;
   a first electrode layer, disposed on the first substrate;
   a colour filter, disposed on the first electrode layer; and
   a liquid crystal layer, disposed between the colour filter and the second substrate;
   wherein the colour filter is doped with silicon nitride and comprises a first colour filter, a second colour filter and a third colour filter, and dielectric constants thereof are different from each other or a dielectric constant of one of the first colour filter, the second colour filter and the third colour filter is different from that of the other two thereof.

2. The liquid crystal panel according to claim 1, wherein a dielectric constant of the first colour filter is determined in accordance with one gamma curve.

3. The liquid crystal panel according to claim 1, wherein a dielectric constant of the first colour filter is larger than that of the second colour filter.

4. The liquid crystal panel according to claim 3, wherein a dielectric constant of the second colour filter is larger than that of the third colour filter.

5. The liquid crystal panel according to claim 1, wherein the first substrate further comprises a protective layer disposed between the first electrode layer and the colour filter.

6. The liquid crystal panel according to claim 1, wherein the liquid crystal panel is a liquid crystal panel with a twisted nematic mode.

7. The liquid crystal panel according to claim 6, wherein a dielectric constant of the first colour filter is larger than that of the second colour filter.

8. The liquid crystal panel according to claim 7, wherein a dielectric constant of the second colour filter is larger than that of the third colour filter.

9. The liquid crystal panel according to claim 7, wherein the first colour filter is a blue filter.

10. The liquid crystal panel according to claim 7, wherein the second colour filter is a green filter.

11. The liquid crystal panel according to claim 8, wherein the third colour filter is a red filter.

12. The liquid crystal panel according to claim 1, wherein the liquid crystal panel is a liquid crystal on silicon(LCOS) panel.

* * * * *